United States Patent [19]
Stevens et al.

[11] Patent Number: 5,557,693
[45] Date of Patent: Sep. 17, 1996

[54] APPARATUS AND METHOD FOR TRANSMITTING OPTICAL DATA

[75] Inventors: Rick C. Stevens, Apple Valley; Gerald F. Sauter, Eagan; John A. Krawczak, Minnetonka, all of Minn.

[73] Assignee: Unisys Corporation, Blue Bell, Pa.

[21] Appl. No.: 327,406

[22] Filed: Oct. 21, 1994

[51] Int. Cl.[6] .................................................. G02B 6/28
[52] U.S. Cl. .............................. 385/24; 359/173; 385/31; 385/115
[58] Field of Search .................... 385/15, 24, 89, 385/115, 116, 121, 31; 359/154, 157, 158, 168, 173, 188, 195

[56] References Cited

U.S. PATENT DOCUMENTS

| | | | |
|---|---|---|---|
| 3,902,786 | 9/1975 | Brown | 385/31 X |
| 4,570,063 | 2/1986 | De Bie et al. | 250/227 |
| 4,760,421 | 7/1988 | Margolin | 355/1 |
| 4,762,391 | 8/1988 | Margolin | 350/96.25 |
| 4,797,951 | 1/1989 | Duxbury et al. | 359/158 |
| 4,812,646 | 3/1989 | Waszkiewicz | 250/227 |
| 4,815,816 | 3/1989 | Schneider | 350/96.25 |
| 5,011,261 | 4/1991 | Gordon | 350/96.25 |
| 5,016,974 | 5/1991 | Lee | 350/96.24 |
| 5,061,036 | 10/1991 | Gordon | 385/116 |
| 5,221,984 | 6/1993 | Furuyama et al. | 359/154 |
| 5,327,514 | 7/1994 | Dujon et al. | 385/115 |

*Primary Examiner*—John D. Lee
*Attorney, Agent, or Firm*—Carl L. Johnson; Charles A. Johnson; Mark T. Starr

[57] ABSTRACT

An apparatus and method for simultaneous transmission of a multiplicity of independent optical data signals without having to precisely align each source of the optical data signals with a single fiber-optic strand including an emitter array for emitting a multiplicity of optical data signals onto one end face of a coherent fiber-optic bundle having a plurality of fiber-optic strands bundled in a contiguous arrangement; and a photodiode array having optical data signals receiving area with the receiving area having a minimum dimension at least as large as a second end of the plurality of fiber-optic strands to enable the optical data signals to travel from the emitter to the photodiode receiving area over one or more of the plurality of fiber-optic strands.

14 Claims, 1 Drawing Sheet

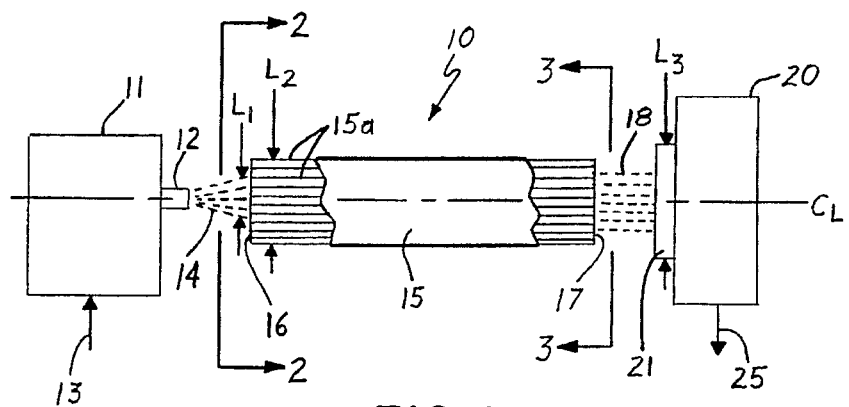
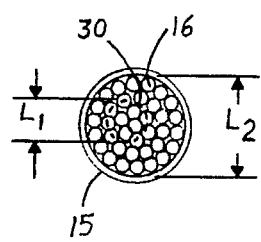
FIG. 2
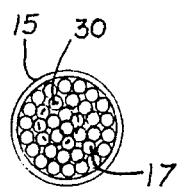
FIG. 3
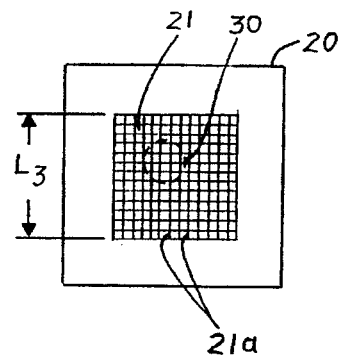
FIG. 4
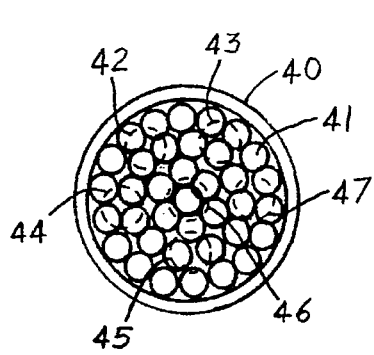
FIG. 5
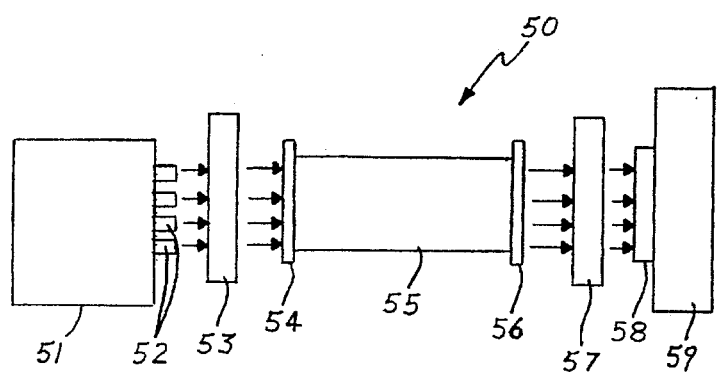
FIG. 6

APPARATUS AND METHOD FOR TRANSMITTING OPTICAL DATA

FIELD OF THE INVENTION

This invention relates generally to optical data transfer and, more specifically, to optical data transfer in bit form through multiple optical fibers located in a coherent fiber-optic bundle.

BACKGROUND OF THE INVENTION

The uses of picture image transmission apparatus in medical procedures is well known and are known as fiber-scopes. The fiberscopes have found particular use in surgery to enable the physician to remotely observe the interior of a body cavity. Still other industrial uses have developed for fiberscopes such as remote inspection of mechanical or nuclear equipment to enable a user to determine what is happening at a hazardous or inaccessible location. The fiberscopes are used to provide a continuous picture image to enable a user to see what is occurring in a remote location. In contrast the present invention is directed toward transmission of a multiplicity of independent streams of data from one location to another where the data is in the form of optical signals. The optical signals can take a variety of different shapes, however, optical signals such as optical data bits, i.e light pulses of intermittent duration are especially suited for transmission with the present invention.

In the present invention light pulses of a predetermined intensity and a predetermined duration can be used to transmit information from one end of a fiber-optic strand to the other end of the fiber-optic strand. By controlling the rate or frequency of the light pulses one can transmit optical data signals in light pulse form from one location to another through a fiber optic strand. One of the problems with transmission of optical data signals from an array of sources through fiber-optic strands is that it requires a time consuming and costly coupling of both the sources and the detectors to the ends of the fiber-optic strands.

That is, it requires a precise physical alignment of the ends of the fiber-optic strands with both the sources and the detectors. With multiple parallel paths the alignment of the emitter and the fiber optic strands can become both time consuming and costly. The present invention eliminates the need for precise alignment in parallel data transmission by use of multiple parallel fiber-optic strands to transmit optical data signals without having to perform the costly and time consuming precise alignment of the sources or the detectors to the individual fiber-optic strands.

If one were to transfer in parallel optical data signals through single strands of optical fiber the optical data signals would each have to be first coupled and aligned with one end of the individual strands of optical fiber. The optical data signals then pass through the optical fiber and emerge from the other end of the strands of optical fiber with the other end of the strands of optical fiber coupled and aligned into receivers or detectors. The present invention passes each separate optical data signal with each portion of the optical data signals being simultaneously transmitted over one or more strands of adjacent and parallel optical strands in a coherent optic fiber bundle. This parallel data transmission could be in either digital or analog form. By using multiple strands of coherently bound optical fiber the present invention permits passage of streams of multiple optical data signals without requiring precise coupling of either the sources or detectors to individual optical fibers. As the portions of data signals emerge from the multiple strands of the coherent optic fiber bundle the portions of data signals are effectively recombined into optical data signals of the original nature with negligible loss of signal strength or integrity due to separation of the signal by the multiple strands of optical fiber.

An advantage of the present invention is that it enables computing systems to transmit optical data in parallel form, historically, optical transmission has been of serial form because parallel optical transmission was not cost effective. Consequently, the requirement of serial transmission limited the usefulness of optical interconnections in computing systems. The present invention eliminates many obstacles to parallel transmission of optical information and provides parallel optical data transmission for computing systems.

Another advantage is the ability to increase the number of parallel channels of the parallel transmission without having to recable.

BRIEF DESCRIPTION OF THE PRIOR ART

U.S. Pat. Nos. 4,812,646 and 4,762,391 disclose a method for determining the associated positions of the ends of non-coherent fiber-optic bundles by using sensors which are smaller than the fibers. By moving the beam on the first face of the bundle and noting the movement on the second face, one can determine the associated positions of the fibers.

U.S. Pat. No. 4,760,421 discloses an electronic printing apparatus and a method of providing coherency to a non-coherent fiber-optic bundle.

U.S. Pat. No. 4,815,816 uses optical fiber elements with different sized end faces to obtain a magnification of the transported image.

U.S. Pat. Nos. 5,011,261 and 5,061,036 show a color-plate scanner which uses three color-coded sensors for each fiber end to enable transmission of color with a monochrome sensor array.

U.S. Pat. 5,016,974 shows an image scanner and a method of making an incoherent fiber-optic bundle act as if it were a coherent fiber-optic bundle.

U.S. Pat. No. 4,570,003 shows a device for optically scanning a document with the light conductor on one end of the coupling member arranged in a straight line and the second end of the coupling member located in an arbitrary position with information on position stored in a memory device.

U.S. Pat. No. 5,327,514 shows a method of calibrating an incoherent optical fiber bundle for image transmission purposes by defining addresses for the ends of the optical fiber bundle.

A 1986 technical review paper titled "Picture Image Transmission Systems by Fiberscope" describes the use of medical fiberscopes for directly transmitting images from one location to another and points out that industrial use of fiberscopes is also for inspecting the interior of machines such as blast furnaces and nuclear equipment.

SUMMARY OF THE INVENTION

Briefly, the invention comprises a method and an apparatus for simultaneously transmitting and receiving a plurality of parallel optical data signals in the form of light pulses from an array of independent sources without having to carefully align the source of each of the optical data signals with a single fiber-optic strand. The system includes an emitter array for emitting a stream of optical data signals onto one end of a coherent fiber-optic bundle which has a plurality of fiber-optic strands bundled in a contiguous arrangement; and a photodiode array having optical data bit receiving regions to enable each of the optical data signals of the emitter array to simultaneously travel to the photodiode array over one or more of the plurality of fiber-optic strands without having to precisely align the fiber-optic strands with either the emitter array or the receiver array.

BRIEF DESCRIPTION OF THE DRAWINGS

FIG. 1 shows a partial schematic view illustrating a single optical data signal being transmitted through a coherent fiber-optic bundle to a photodiode detector array;

FIG. 2 is a view taken along lines 2—2 of FIG. 1;

FIG. 3 is an end view taken along lines 3—3 of FIG. 1;

FIG. 4 is a front view showing the photodiode detector array of FIG. 1;

FIG. 5 shows the embodiment of the invention with multiple optical data links; and FIG. 6 shows multiple streams of optical data being transmitted in parallel through a coherent fiber-optic bundle to a photodiode detector array.

DESCRIPTION OF THE PREFERRED EMBODIMENT

The preferred method and embodiment of the invention comprises a method and an apparatus for simultaneously transmitting and receiving in parallel multiple streams of optical data signals in the form of light pulses from an array without having to carefully align the source of each of the optical data signals with a single fiber-optic strand. FIG. 6 shows the system which includes an emitter array 51 for emitting a stream of optical data signals onto one end of a coherent fiber-optic bundle 55 which has a plurality of fiber-optic strands bundled in a contiguous arrangement. A photodiode array 59 having an optical data bit receiving region 58 to enable each of the multiple streams of optical data signals of emitter array 51 to simultaneously travel to the photodiode receiving array over one or more of the plurality of fiber-optic strands in coherent fiber-optic bundle 55.

While the present invention is intended for simultaneous parallel transmission of multiple streams of optical data signals, in order to illustrate the principle of operation of the present invention the transfer of a single stream of optical data signals will be described. Although the invention is intended for parallel data transmission it should be understood that the present invention is also suited for serial transmission of a single data stream.

To describe the principle of operation a transfer of a single stream of optical data will be described. Reference should be made to FIGS. 1 to 5 which shows an emitter 11 receiving an electrical input signal 13 and transmitting an optical signal in the form of light pulses through a port 12 onto one end of a coherent fiber-optic bundle 15. Emitter 11 can be a laser diode such as a Surface Emitting Laser (SEL) or the like. The coherent fiber-optic bundle 15 is shown with a protective jacket partially cut away to reveal individual optical strands 15a which are fused to each other. The coherent fiber-optic bundle 15 provides an optical interconnection between an emitter 11 and a receiver 20. Typically, the coherent fiber-optic bundle 15 contains a large number of strands of optical fibers having a typical diameter of 4–40 micrometers. The individual optical strands 15a have a thin outer cladding and are fused together in a parallel relationship throughout the coherent fiber-optic bundle 15 so that the ends of each fiber-optic strand 15a are in the same geometrical location with respect to the end faces of the coherent fiber-optic bundle 15. This feature of parallel relationship allows the coherent fiber-optic bundles to split the optical data signals and transmit a portion of the optical data signals over a number of adjacent strands of optical fiber. In the preferred embodiment the strands of optical fibers 15a are fused together, with their cladding on, to preclude mixing of signals from one optical fiber to another. The multiple optic fibers 15a provide a multiple path media to transfer optical energy to the appropriate photodiode receiver in photodiode array 20.

The diameter of the coherent fiber-optic bundle 15 is indicated by $L_2$ and the diameter of projected image from the laser diode 11 onto the end face 16 of the coherent fiber-optic bundle 15 is indicated by $L_1$, which is smaller in diameter than $L_2$ to ensure that the light signal 30, which may have a diameter $L_1$ larger than the diameter of any of the strands of the coherent fiber-optic bundle 15 is entirely encompassed by the end face of the coherent fiber-optic bundle 15.

The coherent fiber-optic bundle 15 comprises multiple groups or strands for carrying bits of optical information in a parallel relationship throughout the bundle. When a data signal in optical form is projected on one end face of the fiber-optic bundle 15 the optical data signal can extend over the end of multiple strands of optical fiber causing the optical data signal to be split into multiple paths that simultaneously travel along adjacent individual fibers 15a and emerge at the other end face 17 where the optical data signal is received by one element of the photodiode array 20. By fusing of the optical fibers one minimizes the optical losses due to non-optically transmissive gaps between the individual fibers.

To illustrate the operation of the invention, reference should be made to FIGS. 1, 2 and 3. FIG. 2 shows an optical signal 30 (dashed circle) on the end face 16 of the coherent fiber-optic bundle 15. Note, that the dimension $L_1$ indicates that the diameter of the optical data signal 30 is substantially less than the diameter $L_2$ so that the entire data signal 30 is within the confines of the coherent fiber-optic bundle 15. By allowing the optical data signals to overlap the ends of multiple strands but remain within the diameter of the fiber-optic bundle, the need for precisely aligning a multiplicity of individual strands of optical fiber with the emitter array is eliminated.

FIG. 3 shows the optical data signal 30 emerging from end face 17 with the optical signal 30 located in the same geometric position to the second end face 17 as the input data signals 30 is to the first end face 16. That is, because the fiber-optic strands of the coherent fiber-optic bundle 15 are located in a parallel relationship the optical data signal though split among separate but adjacent fibers in the bundle retain their relative position during transmission.

FIG. 4 shows the outline of a projected data signal 30 on the photodiode array 20 with grid marks located thereon. The photodiode array 20 has separate receiving areas with a dimension $L_4$ which is sufficiently large so that the projected data signal 30 is defined totally within one of the photodiode array receiving areas.

Thus, the data signal 30 can extend over multiple strands on end face 16 where it travels over into one or more of the multiple strands to eventually emerge as one data signal that can be detected by one element of the photodiode array 20. That is, by projecting the optical data into the end face 16 of fiber-optic bundle 15 and using a plurality of strands of fiber-optical cable instead of a single strand, one has reduced the need for costly and time-consuming alignment of the source and the detector to the ends of the fiber-optic bundle.

To illustrate the process of the method with use on multiple parallel data transmission, refer to FIG. 6 which shows a commercially available two-dimensional Vertical Cavity Surface Emitting Laser (VCSEL) army which emits its optical output in the form of light pulses from multiple independent laser ports 52. For convenience, the optical signals are directed toward a relay lens 53 which directs the optical information onto an optical end face member 54 which is located on the end of the fiber-optic bundle 55. Similarly, an optical end face member 56 allows the optical signals to be projected by lens 57 and onto the photodiode array 59.

In the embodiment shown in FIG. 6, it is shown that ports 52 emit a plurality of independent signals in optical data form which is shown as images 42, 43, 44, 45, 46 and 47 on end face 41 illustrated in FIG. 5. As shown in FIG. 6, the VCSEL array emits its optical output through multiple independent ports 52.

The present invention provides a parallel data optical interconnect structure that does not rely on high-precision alignment and costly manufacturing techniques to insure reliability; the receiving photodiode assembly can tolerate angular and directional misalignment between the coherent fiber-optic bundle 15 and the photodiode array 20.

In the transmitter parallel optical data link 51 as shown in FIG. 6, for convenience in fabrication, a micro-optic lens army is used to collimate each of the individual sources from the VCSEL army. A microlens army can be used to reduce the divergence to a very small angle, when it is desirable to relay an image of the array to the input of the fiber-optic bundle.

If the cross-talk introduced by collimation with microlens is too large, one can introduce an additional optical surface such as end face member 54 to image the expanded VCSEL array image onto the fiber bundle. For example, this could be performed conveniently by fabricating a diffractive optical element directly on end face member 54. An advantage of using a diffractive optical element is that the diffractive optical element can be made extremely thin in planar form. To keep fabrication costs low, the diffractive optical elements can be made in plastic or epoxy, resulting in an inexpensive mass-fabrication process.

Thus in the present invention streams of multiple optical data signal represented by a series of intermittent light pulses can be transmitted from a source to a receiver without precisely aligning the source and receiver to each strand of the fiber optic bundle.

In some applications the coherent fiber-optic bundle 50 must be removable. In these cases, an additional degree of alignment tolerance between the fiber image and the detector array can be achieved by having the area of each detector larger than the image of its corresponding laser source. An alternative is to use the microlens array to redirect the light from many possible source positions onto a single small detector, thereby increasing the allowable tolerance to mispositioning without degrading the detector performance.

Thus, a feature of the invention is that it provides a method of simultaneously transmitting streams of multiple independent optical data signals from one location to another by transmitting each independent optical data signal through a distinct plurality of fiber-optic strands in a common bundle. That is, even though an individual optical data signal travels over several adjacent fibers with portions of the optical data signal necessarily blocked from passage by the spaces between adjacent strands of optical fiber the portions that pass through adjacent strands emerge from the opposite end of the coherent fiber optic bundle as a useful signal of substantially the same integrity as the incoming signal.

We claim:

1. An apparatus for splitting and parallelly transmitting streams of optical data signals without having to precisely align a source of each of the streams of optical data signals with a single fiber-optic strand comprising:

an emitter array for emitting a plurality of optical data signals over a given area;

a coherent fiber-optic bundle, said coherent fiber-optic bundle having a plurality of fiber-optic strands bundled in a contiguous arrangement, said plurality of fiber-optic strands each having a first end for receiving the streams of optical data signals from the emitter array and each having a second end for emitting the streams of optical data signals from the plurality of fiber-optic strands, said plurality of fiber-optic strands being sufficiently small in relation to a single stream of optical data signals so that the single stream of optical data signals are split into partial signals with each of the partial signals transported in separate and adjacent fiber-optic strands so that when the emitter array directs the streams of optical data signals onto the first end of the plurality of fiber-optic strands each of the streams of optical data signals are transmitted in whole through two or more of said plurality of fiber-optic strands to the second end of the plurality of fiber-optic strands.

2. The apparatus of claim 1 including:

a photodiode array having an optical data signal receiving area with a receiving area having a minimum size sufficiently large so as to completely encompass an area covered by one of the streams of optical data signals emerging from the fiber-optic strands.

3. The apparatus of claim 2 wherein the given area has a maximum dimension $L_1$ and said receiving area has a minimum dimension $L_4$ that is greater than the dimension $L_1$.

4. The apparatus of claim 1 including a microlens to collimate the optical data signals with the fiber-optic strands.

5. The apparatus of claim 1 including at least 30 fiber-optic strands in said fiber-optic bundle.

6. The apparatus of claim 1 wherein the fiber-optic strands have a diameter ranging from 4 to 40 micrometers.

7. The apparatus of claim 1 wherein the emitter array comprises a laser diode array.

8. The apparatus of claim 1 wherein the fiber-optic strands include a cladding to prevent cross-talk between the fiber-optic strands.

9. An apparatus for simultaneously transmitting a plurality of independent optical data signals over distinct paths without having to precisely align the optical data signals with a single fiber-optic strand comprising:

an emitter for emitting a plurality of optical data signals of predetermined dimensions; and a coherent fiber-optic bundle, said coherent fiber-optic bundle having a plurality of fiber-optic strands bundled in a contiguous arrangement, said plurality of fiber-optic strands each having a first end for receiving optical data signals from the emitter and each having a second end for emitting the optical data signals from the plurality of fiber-optic strands, said first ends of said plurality of fiber-optic strands forming a contiguous area which is larger than the predetermined dimensions optical data signals so that when the emitter directs the optical data signals onto the first end of the plurality of fiber-optic strands the optical data signals need not be aligned with a fiber-optic strand in order to transmit the optical data signals through one or more of the fiber-optic strands to the second end of the plurality of fiber-optic strands.

10. The apparatus of claim 9 including a receiver for receiving the signal from one or more of the fiber-optic strands.

11. The apparatus of claim 10 wherein the emitter transmits multiple optical signals through distinct groups of fiber-optic strands to enable simultaneous transmission of optical data in multiple parallel paths.

12. A method for transmitting and receiving optical data signals without having to align the optical data signals with a single fiber-optic strand comprising:

directing a portion of an optical data bit onto a first end of a first fiber-optic strand of coherent fiber-optic bundle and a further portion of the optical data bit into a first end of a second fiber-optic strand of the coherent fiber-optic bundle wherein the coherent fiber-optic bundle has a plurality of fiber-optic strands bundled in a contiguous arrangement to thereby simultaneously transmit portions of the optical data bit through separate and adjacent fiber-optic strands; and receiving the portions of the optical data bit with a photodiode array from one or more fiber-optic strands.

13. A method of transmitting optical data signals from one location to another comprising:

transmitting without aligning a single stream of optical data signals onto an end face of a coherent fiber-optic bundle having a plurality of fiber optic strands each having individual end faces with the single stream of optical data signals extending over two or more end faces of individual fiber-optic strands to separate the single stream of optical data signals so that a portion of the single stream of optical data signals are carried by one of the individual fiber optic strands and a further portion is carried by an adjacent individual fiber optic strand to thereby enable simultaneously transmission of portions of the single stream of optical data signals from one end of the coherent fiber-optic bundle to the other end of the coherent fiber-optic bundle while maintaining the same usefulness of the stream of optical data signals.

14. An apparatus for transmitting a stream of optical data signals without having to precisely align a source of the stream of optical data signals with a single fiber-optic strand comprising:

an emitter for emitting a single stream of optical data signals, a coherent fiber-optic bundle, said coherent fiber-optic bundle having a plurality of fiber-optic strands bundled in a contiguous arrangement, said plurality of fiber-optic strands having a first end for receiving the stream of optical data signals from the emitter and a second end for emitting the stream of optical data signals from the plurality of fiber-optic strands so that when the emitter directs the single stream of optical data signals onto the first end of the plurality of fiber-optic strands the single stream of optical data signals is transmitted in whole or in part through one or more of said plurality of fiber-optic strands to the second end of the plurality of fiber-optic strands where it can be received as the single stream of optical data signals.

* * * * *